United States Patent [19]

Strack

[11] 3,945,975

[45] Mar. 23, 1976

[54] SEALING ADHESIVE STRANDS AND COMPOSITIONS THEREFOR

[75] Inventor: Donald Robert Strack, Dayton, Ohio

[73] Assignee: Protective Treatments, Inc., Dayton, Ohio

[22] Filed: Dec. 23, 1970

[21] Appl. No.: 101,084

Related U.S. Application Data

[63] Continuation-in-part of Ser. No. 551,878, May 23, 1966, abandoned, and a continuation-in-part of Ser. No. 611,129, Jan. 23, 1967, Pat. No. 3,478,475, and a continuation-in-part of Ser. No. 607,022, Jan. 3, 1967, Pat. No. 3,500,603, and a continuation-in-part of Ser. No. 738,548, June 20, 1968, abandoned.

[52] U.S. Cl. .................. 260/33.6 AQ; 260/27 BB; 260/31.2 MR; 260/31.8 M; 260/31.8 DR; 260/31.8 Z; 260/33.8 UA
[51] Int. Cl.².... C08K 5/01; C08K 5/03; C08K 5/12
[58] Field of Search.. 260/33.6 AQ, 41.5 R, 41.5 A, 260/31.2 MR, 31.8 DR, 27 BB

[56] References Cited

UNITED STATES PATENTS

| | | | |
|---|---|---|---|
| 3,239,495 | 3/1966 | Small | 260/41.5 R |
| 3,338,861 | 8/1967 | Mastin | 260/41.5 R |
| 3,393,173 | 7/1968 | Berry | 260/41.5 R |
| 3,400,090 | 9/1968 | Maslow | 260/33.6 AQ |
| 3,401,050 | 9/1968 | Scheibelhoffer | 260/37 N |
| 3,401,141 | 9/1968 | Toth | 260/37 N |
| 3,402,220 | 9/1968 | Bierman | 260/888 |
| 3,444,117 | 5/1969 | Higgins | 260/41.5 R |
| 3,484,405 | 12/1969 | Seto | 260/41.5 R |

*Primary Examiner*—Paul R. Michl
*Attorney, Agent, or Firm*—Dressler, Goldsmith, Clement & Gordon, Ltd.

[57] ABSTRACT

New sealing adhesive bed compositions for glazing are form retaining and comprise elastomeric material initially mixed with plasticizers of low volatility and finely divided solids which either are of fibrous form or produce thixotropic mixtures with the plasticizers. A ratio range of from ¾ to 2½ parts non-volatile plasticizers to one part elastomeric material, and from 0.3 to 2½ parts such finely divided solids to one part elastomeric material is present. Other kinds of finely divided solids and other ingredients may be present. The glazing strand is formed by extrusion, and the formed strand is not cured after extrusion. The tapes permanently deform under pressure when the glass is installed, have low spring back and exhibit little or no creep or cold flow in service.

8 Claims, 3 Drawing Figures

Inventor:-
Donald Robert Strack,
By　　　　　　Atty.

SEALING ADHESIVE STRANDS AND COMPOSITIONS THEREFOR

This application is a continuation-in-part of my applications Ser. No. 551,878, now abandoned, filed May 23, 1966 for GLAZING COMPOSITIONS; Ser. No. 611,129 filed Jan. 23 1967, for MOUNTING UNIT EMPLOYING DUAL GASKET CONSTRUCTION now U.S. Pat. No. 3,478,475; Ser. No. 607,022 filed Jan. 3, 1967 for SELF SUPPORTING, NON-LOAD BEARING RESILIENT TAPE SEALANT now U.S. Pat. No. 3,500,603, and Ser. No. 738,548, now abandoned, filed June 20, 1968 for ADHESIVE SEALING GLAZING COMPOSITION, and the disclosures of such applications are incorporated herein by reference.

This invention relates to sealing adhesive bed strands and compositions therefor to be employed for adhesively attaching together two members, for example, automobile windshield lights and back lights.

It has been proposed to seal the windshield glass and back light in an automobile by means of a composition applied to form a sealing adhesive bed upon which the glass is installed. Compositions heretofore proposed for such purpose were compounded with certain elastomer materials, plasticizers and certain particulate solids. Fully cured elastomers cannot be extruded to form strands. It has been proposed to include a curing agent in the strand forming composition together with curable elastomers, and effect curing after the tape is formed - either before or after installation. Curing however changes the properties of the strand to such extent as to cause failures in service. Both cured and uncured tape compositions have been proposed, but heretofore have not been satisfactory.

The problems involved and the solution of the problems by the invention are explained in detail in connection with the installation of an automobile windshield by way of example. The flange in the automobile body surrounding the windshield glass opening on the inside (operator's side) is called the pinch weld flange, and it provides the back stop for the windshield glass. The sealing adhesive composition is applied in a layer against the pinch weld flange either by applying the sealing adhesive material as a preformed tape, or strand (usually mounted on a removable low adherence backing of paper or other inexpensive material, which is provided to facilitate handling and which is readily separated from the tape before installation of the glass), or by applying a curable sealing adhesive material through a nozzle under sufficient pressure to form a layer or bed in the frame or on the glass or on both at the installation site. The windshield light is then pressed into place against the sealing adhesive composition so that the sealing adhesive composition adheres both to the pinch weld flange and windshield glass. The joint between the glass and frame is then covered by an ornamental moulding. When a curable composition is used it is then cured before or after applying the moulding. In some instances a primer is applied adjacent the edge of the windshield light prior to insertion to promote adhesion between the sealing adhesive composition and glass and is also applied to the pinch weld flange to promote adhesion between the sealing adhesive composition and flange. It is generally required that the glass be held in place entirely by the sealing adhesive composition, and the glass is not permitted to contact any metal parts. Performance requirements after installation is completed do not greatly differ, regardless of the method of applying the adhesive sealing material.

It is not feasible to provide the frames and curved glass lights for automobile windshields so accurately formed that the flange in the frame is uniformly spaced from the surface of the glass. Nor is it feasible to avoid irregularities in the flange. Thus, to insure sealing contact of the sealing adhesive composition with the irregular flange surface and the glass the sealing adhesive composition is applied as a layer of substantial thickness. It is required the composition should adhere to the glass and metal surfaces, and cold flow under pressure exerted by the glass at installation so as to flow into and seal irregularities and make intimate contact with the glass. After installation, and in operation of the automobile it is required that the sealing adhesive composition shall not cold flow to any substantial extent, and shall maintain an air tight and water tight seal between the glass and frame through an accelerated life test generally equivalent to the life expectancy of the automobile.

In operation, the frame is subject to vibration and torsion and the glass is subject to variable wind pressures. There is also a wide variation in ambient weather conditions and temperatures to which the sealing adhesive composition is exposed in the operation of the automobile. The adhesive sealing compositions also must withstand heating in connection with the enamel finishing of the body, yet the composition should hold the glass against shifting.

It is required if the sealing adhesive composition is applied as a preformed tape, that in addition to having good adherence to glass and painted metal frame, the tape should be initially easily deformable to compress to the desired thickness, but after such initial deformation, it should become resistant to cold flow and exhibit limited rebound. These are antithetical properties because absence of rebound is generally accompanied by cold flow, and deformability under pressure is a characteristic of cold flow. Too resilient a composition may allow the glass to vibrate to such extent as to crack the glass and breakage or noise may be caused by contact with the metal moulding. Too rigid a composition or too little coherence may result in failure at the glass or metal interfaces or splitting of the composition.

The bedding compositions heretofore proposed have not met these requirements in a satisfactory manner, and auxiliary devices and supplementary treatments have been employed in attempts to overcome their deficiencies. For example, to limit or direct cold flow, dams have been proposed and space blocks have been proposed to limit the compressive forces applied to the composition after glass installation. However, in general, bedding compositions heretofore proposed which will deform as necessary at installation have been deficient, either by having too much rebound, or by exhibiting cold flow. Other failures have occurred at the interfaces of the compositions with the glass or metal or by lack of cohesiveness of the compositions.

The compositions of the present invention are form retaining and comprise an intimate mixture of elastomeric material, a plasticizer of low volatility and finely divided solids which either are of fibrous character or produce thixotropic mixtures with the plasticizers employed. In addition the compositions may contain other ingredients known in the art for compounding into sealing adhesive elastomeric compositions. The compositions are generally preformed into a tape or strand of suitable shape and dimensions and the strand is uncured. The tape may be mounted on a suitable low adherence backing, and is used in this form for glazing. The tape may be heat treated to relieve internal strain and further reduce cold flow, but such heat treatment does not effect curing because no active curing agent is present in the tape.

In general, such properties as resistance to oils, to oxidation, aging, ultra violet radiation, weathering and the like, are characteristics of the elastomeric materials, although additives may be incorporated for promoting or improving such and other properties. Accordingly, the invention contemplates the use in the compositions of elastomeric material, which may be selected on the basis of such properties, relative cost, and other desirable qualities. Among the elastomeric materials which are suitable and may be selected for use alone or in mixtures are the butyl rubbers, halogenated butyl rubbers, cross linked butyl rubbers, polyisobutylene rubbers, ethylene-propylene rubbers, ethylene-propylene terpolymers, thioplasts, chlorosulphonated polyethylene, butadiene-styrene rubbers, butadiene nitrile rubbers, polychloroprenes, polyisoprenes, and the like. Commercial examples of polychloroprenes are Neoprene WRT, Neoprene KNR, Neoprene FC; of ethylene-propylene rubber is Enjay EPR404; of ethylene-propylene terpolymer is Enjay EPT 3509. The elastomers are employed preferably in dry form as distinguished from latices. A blend of Neoprene WRT with Neoprene KNR or Neoprene FC produces a composition having a lower rebound than if Neoprene NRT only is present as the elastomer.

The preferred elastomers are the uncured polybutylene based elastomers, as these have desirable properties such as resistance to aging, weathering, ozone and radiation, and retain elasticity over a wide temperature range. Examples of suitable polybutylene based elastomers are halogenated butyl rubbers as described in U.S. Patent No. 2,944,578; (commercial examples of which are Enjay Butyl HT 10-66 and HT 10-67); butyl rubbers described in Taylor U.S. Patent No. 2,356,128, which are copolymers of about 70 to 99.5% weight of isoolefins and about 30 to 0.5% of a diolefin (commercial examples of which are Enjay butyl 365, Enjay butyl 218 and Polysar 301); cross linked butyl rubbers such as copolymers of isobutylene and divinyl aromatic compound with or without a small amount of a diolefin as exemplified by British Patent Nos. 642,050 and 682,771 (a commercial example of which is Polysar butyl XPRDA 925) and isobutylene rubbers, commercial examples being Vistanex MML80; (mol. wt. 64,000 to 81,000); MML100 (mol. wt. 81,000 to 99,000); MML120 (mol. wt. 99,000 to 117,000) and MML140 (mol. wt. 117,000 to 135,000).

If desired, polybutylene based rubbers which have been heat treated with carbon black with or without promoters in known manner may be employed, but use of such partially cross linked rubbers is not essential in this invention. Master batches commercially available may be employed, such as cold black or cold-oil-black master batches, in which case the amount of plasticizer added takes into account the amount in the master batch. Such materials are commercially available. In using partially cured or cross linked elastomer the cure should not be carried out to the extent where the elastomer cannot be mixed with the other ingredients or where the mixture cannot be extruded satisfactorily. Solubility in cyclohexane is a measure of the absence of cure or degree of uncure. The terms cure and cross linking are generally used synonomously in the art.

Rebound or springback after deformation is a characteristic of elastomeric materials and frequently such materials also exhibit cold flow. That is, they slowly spread out under pressure or permanently conform to surfaces with which they are in contact. It is known that plasticizers reduce the rebound characteristics and increase cold flow of elastomers to an extent which depends on the nature of the plasticizer and the nature and proportion of elastomeric material employed. The non-volatile plasticizers do not evaporate over the expected life of the compositions, but when employing large amounts of plasticizers to reduce spring back, the additional problems arise of retaining the plasticizer against exudation and preventing cold flow.

The copolymers of isobutylene and a divinyl aromatic compound of the type referred to herein generally exhibit more resilience or spring back then the other polybutylene based elastomers, but as they retain larger amounts of plasticizers of the less expensive oil types withoug exudation or bleeding they can be compounded to substantially eliminate spring back if desired. It is generally desirable to use two or more elastomers in compounding the sealing adhesive compositions so as to provide a broader range of useful properties, and in this way a desired average Mooney number for an elastomer may be obtained. Rubbers which do not extend well with oil, such as butadieneacrylonitrile polymers, are used only in minor amounts in admixture.

The finely divided solids which are an ingredient of the compositions should be selected to exhibit resistance to deterioration by weather, aging, rot, radiation and other conditions encountered in service. Not all solids which fulfill these requirements will limit cold flow to the required extent. For such purpose, according to the invention, the finely divided solids should be either of fibrous form, or should produce thixotropic mixtures with the plasticizers employed. In some instances these two characters are combined in fibrous solids which produce such thixotropic mixtures. Furthermore, in the case of fibrous solids the fiber lengths should be quite short so that the fibers do not "ball up" in the mixing operation. "Balling up" of the fibers produces a non uniform composition lacking in strength and smoothness of surface. Examples of suitable finely divided bulk fibrous solids which may be used include fibrous mineral solids, such as asbestos, fibrous talc, wollastonite and bulk glass fibers; synthetic materials such as nylon and the like. Examples of thixotropic forming solids include "Bentone" and very finely divided colloidal size silicas. Commercially available examples of such materials are: of asbestos, Carey 7RF10; of fibrous talc, International Fiber No. 1; of wollastonite, International Wollastonite Pl; and of silica, "Cab-O-Sil". The less expensive materials are preferred, other conditions being equal.

Among the available finely divided fibrous mineral solids, bulk asbestos is outstanding in its ability to limit cold flow and retain large amounts of viscous liquid, and is the finely divided fibrous material of choice. Bulk asbestos fiber is commercially available in various degrees of fiber length or fineness and in various types, and generally is graded for fiber length by the Quebec screen test of the Quebec Asbestos Producers Association (abbreviated Q.A.P.A.). (Encyclopedia of Chemical Technology, 1st ed. asbestos p. 138.) In general the fiber length in the No. 7 milled grades is satisfactory, and the R type is preferred. The milled grades numerically above 7 and alphabetically above R, (which are finer and have shorter fiber lengths) can be employed. Fibers of other materials which correspond in fineness to the grades of asbestos above stated are suitable. Longer fibers tend to ball and do not mix uniformly into the compositions. In general, there is employed a ratio range of from about 0.3 to 2½ parts finely divided bulk solids by weight of the kinds herein stated to one part elastomeric material in making preformed tapes, the preferred range being from about 0.5 to 1½ parts.

The mechanism by which the apparently antithetical properties in the compositions of the invention are obtained are not fully understood at present. Possibly, the selected finely divided solids, in conjunction with the non-volatile plasticizer liquid introduces thixotropic properties so that the compositions permanently deform under the pressure employed in installing the glass, and thereafter the thixotropic action inhibits spring back and further deformation under the forces encountered in service.

The presence of finely divided fibrous solids results in a rough surface when the composition is extruded as a tape or rope, or is rolled into a sheet, although the finer grades of fibrous solids result in smoother surfaces. The smoothness upon extrusion or rolling is improved by the presence, in addition to fibrous solids, of carbon black, hydrated silica and/or platy talc. The total amount of finely divided solids in the compositions should be at least about 93 parts per hundred parts of elastomer, the upper limit being determined by the desired properties and characteristics of the tape, and thus can be varied widely. For example, an upper limit of 250 to 300 parts total finely divided solids per hundred parts elastomer may be used.

The low volatile plasticizers referred to above do not volatilize to any significant extent over the life of the compositions, and are regarded as permanent plasticizers. They should be compatible with the elastomers present, and may be selected from the relatively large groups commercially available, including processing oils, liquid polyolefins, ester plasticizers, and chlorinated polyhydrocarbons, low melting resins and broken down rubbers. The liquid grades of polyolefins, especially polymers of the $C_3$ to $C_4$ olefins, such as, for examples, polybutenes, (for example liquid polybutene having Gardiner Holdt viscosity Z4+ at 77°F.) polyisobutylenes, propylene polymers are suitable. Also suitable are viscous liquids generally regarded as plasticizers in the elastomer art, such as polychlorinated polyphenyls known under the commercial names "Aroclor 1254" and "Aroclor 1268" and the ester plasticizers for example, dioctyl phthalate, dioctyl sebacate, butyl oleate, and liquid wood rosins.

One of the functions of the low-volatile plasticizer in the compositions and tapes of this invention is to permanently soften the composition so as to reduce spring back or rebound and allow permanent deformation under reduced load, and the plasticizer cooperates with the selected finely divided solids to prevent cold flow. The amount of plasticizer required to produce a predetermined degree of softening varies with the particular elastomer employed, and the plasticizer selected, and with the amount and kind of finely divided fibrous solids present, but in general for making preformed tapes the total amount by weight of the low-volatile plasticizer or mixture of low-volatile plasticizers in the composition should be from about ¾ to 2½ times the weight of elastomeric material in the composition, the preferred ratio range being about 1.2 to 1.75 times the weight of the elastomeric material.

There are many oils, generally called processing oils, which are commercially available at low cost, and can be used as non-volatile plasticizers in the compositions. Many of these are generally of paraffinic and napthenic origin, of low volatility, and are commercially available under trade names of the suppliers. Aromatic processing oils also are available, a commercial example being Sundex 53, and can be used with some elastomers. The paraffinic and napthenic processing oils are generally sold as pale or red engine oils free of additives. The preferred hydrocarbon oil plasticizers are those having a viscosity range at 100°F. of about 100 to 4,000 Saybolt Universal Seconds (abbreviated SUS). Examples of such oils by trade names are Necton 60, Famax 58, Coray 80, Sun Oil 2280 and "Circo Light". Examples of suitable fluid polyolefin plasticizers by commercial names which may be used with or instead of processing oils are: of polyisobutylene, "Vistanex LM-MS" (mol. wt. 8700–10,000): of propylene polymers, "polypropene C-175" from Amoco Chemicals Corp.; of polybutenes, "Oronite 128", and "Polybutene H 1900".

The compositions may contain other ingredients known in the art such as tackifiers, wetting agent, other extrusion smoothing ingredients than those above stated, preservatives, and the like. Carbon black is a desirable ingredient in some of the compositions where it improves the cohesiveness or tensile strength of the composition and imparts other desirable properties. Titanium dioxide may be present. Calcium oxide or equivalent materials may be added to bind water, and calcium carbonates may be present as part of the total quantity of finely divided solids.

A number of substances are known in the art as ingredients of elastomer tapes to produce tackiness, and these may be included for such purpose. Examples of suitable tackifiers are chlorinated biphenyls illustrated by "Aroclor 1254" and "Aroclor 1260", non-reactive and heat reactive polymethylol phenol resins (commercially available under the names Amberol ST 137X; Catalin 8318, BRL 2741 from Union Carbide Corp.; and SP 1047 of Schenectady Varnish Co.), rosins, hydrogenated rosins, and esterified rosins (exemplified by the commercial products Pantalyn H, Staybelite resin, Staybelite ester 3) and ethyleneglycol monobutyl ether pelargonate. Adhesion to glass and metal can be increased by incorporating known adhesion promoters, for example, gamma-amino propyltriethyloxy silane (for example, Silane A 1100 of Union Carbide Corp.), rosins, rosin esters and the like. Adhesion of the compositions to glass and to painted metal surfaces may be improved by coating the surfaces with a primer composition known in the art for this purpose. Suitable primers include gamma-amino propyltriethyloxy silane, and known butyl rubber primers.

Compressibility of the tape, that is, in thickness of the tape under pressure, is a quality useful mainly upon installation of the glass. Accordingly, the compositions may contain a small amount of a compatible volatile plasticizer to temporarily increase compressibility, this being claimed and described in my application Ser. No. 841,727 filed July 15, 1969, for Form Retaining Hardenable Sealing Strands and Compositions.

The composition may be extruded into strands of various forms as desired for use as glazing tapes. Generally, the strands are mounted on a pliable strip of suitable adhesion repellant material, such as paper, which has been treated with polyethylene, or with a silicone or other material to reduce adhesion of the strand thereto. Such strips are known in the art for mounting glazing tapes.

The strand should be soft enough to deform to about half thickness under the pressure applied to position the windshield. In machine installation of windshields higher installation pressures are usable, so that a stiffer strand may be employed than for manual installations. Generally, the tape is applied to the frame, the backing strip is removed, and the glass then is inserted. However, in a two tape system, one tape is applied to the periphery of the glass, and the other is applied to the frame, (the backing strips being removed) and these merge when the glass is positioned in the frame. In such two tape system the tapes may be of like or unlike shape, and may be of like or unlike composition. A combination of a flat tape or ribbon with a triangular tape of like or unlike composition may be employed. Such tape forms are described in said application for patent Ser. No. 611,129, issued as U.S. Pat. No. 3,478,475.

A tape for automotive glazing should have an elongation well over 100%, as for example, 400 to 1000%, low modulus of elasticity, should compress to one-half thickness under a force of 80 to 120 pounds on a six inch length, (or approximately 25 to 46 pounds per square inch), have a rebound 1 hour after compression under a weight of 1½ pounds in the range of about 2½ to 12½% of original thickness, flow after 24 hours at 190°F. under a weight of 1½ pounds in the range of zero to 0.02 inch, measured as reduction in height, have a tensile yield strength of about 6 to 15 pounds per square inch, and have good adhesion under vibration to glass and metal. In a destructive tension test with the composition adhering to opposed plates, cohesive failure rather than adhesive failure should occur. The preferred rebound range is 2½ to 7½ percent.

A severe test is to compress the strand (two three in. lengths) to half thickness between a glass and a metal plate, release compression, then subject the sample to 190°F. for two weeks in an oven, then cool the sample to room temperature and subject it to a destructive tension test at room temperature. Failure should occur entirely in cohesion. For this test a suitable primer known in the art may be used to increase adhesion of the test sample to the plates.

In the accompanying drawing are shown several forms of glazing tapes illustrating preferred shapes. In the drawing.

Figure 1:
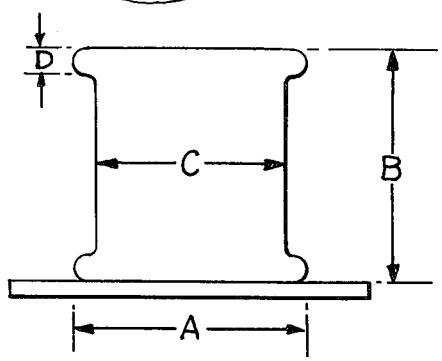
FIG. 1 shows in cross section an I-beam form of tape mounted on a supporting strip.

In FIG. 1, the dimensions A and B for a typical tape may be 0.4 inch, dimension C is about 0.32 inch and dimension D is a fillet of about 0.03 inch radius.

Figure 2:
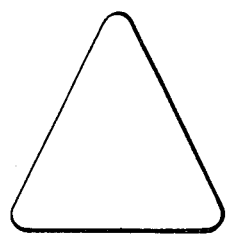
FIG. 2 shows in cross section a triangular tape.

In FIG. 2 the triangle is truncated and may have an altitude of about one-fourth inch.

Figure 3:
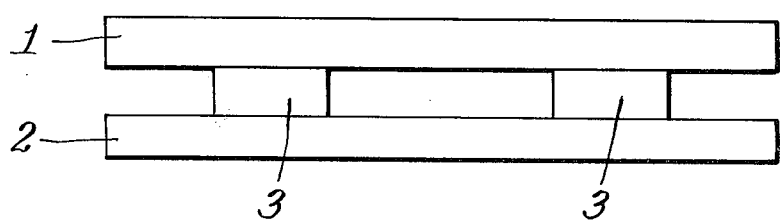
FIG. 3 illustrates a compressibility-recovery test assembly.

In FIG. 3, numerals 1 and 2 designate polished glass plates and numeral 3 represents two lengths of tape, each three inches long, interposed and positioned for a compressibility recovery test.

The invention is illustrated by the following examples of preferred embodiments of the invention.

| Ingredient | Parts by Weight Example I | Example II |
|---|---|---|
| (a) Chlorinated butyl rubber | 200 | 200 |
| (b) Isobutylene-divinylaromatic copolymer | 200 | 200 |
| Hydrogenated wood rosin | 44 | 44 |
| Tall oil fatty acid | 8 | 8 |
| Carbon black (140 parts) | 82.3 | 82.3 |
| Oil in carbon black | 57.7 | 57.7 |
| Asbestos powder | 320 | 320 |
| Processing oil | 475 | 475 |
| Platy talc | 320 | 320 |
| Lime (calcium oxide) | 46 | 46 |
| (c) Heat reactive phenol-formaldehyde condensate (in 95% water solution) | | 40 | a. A copolymer of 98 to 98.5% isobutylene with 1.5 to 2% isoprene chlorinated to 1.1 to 1.3% chlorine content, having about 1 to 2% unsaturation, an average viscosity molecular weight about 350,000 to 400,000 and a Mooney viscosity value of 50 to 60. A commercial example is "Enjay" butyl HT 10-66.

b. A copolymer of about 98 to 98.5% isobutylene, 1.5 to 2% isoprene and about 0.5% divinylbenzene. It has a Mooney value about 70. A commercial example is Polysar butyl XPRDA925. (Also called herein cross linked butyl rubber).

c. A commercial example of the heat reactive phenol-formaldehyde condensate is BRL 2741. This ingredient reacts with aminosilane primers to promote adhesion.

The hydrogenated wood rosin increases tackiness. An example of commercial hydrogenated wood rosin is "Staybelite" resin, which has an acid number of about 165, a saponification number of about 167 and an ASTM ring and ball softening point of 68°C. The tall oil fatty acid acts as a wetting agent for the particulate materials. An example of commercial tall oil fatty acid is Acintol FA2 from Arizona Chemical Co. A commercial example of carbon black in oil is Statex M70 from Columbian Carbon Company, which contains about 100 parts by weight carbon to 70 parts by weight oil. In 140 parts this amounts to 82.3 parts black and 57.7 parts oil. A commercial example of processing oil is Sun Oil 2280. Commercial examples of asbestos powder, hydrated silica powder and platy talc are respectively: 7RF10 from Philip Carey Mfg. Company, Hi-Sil 233 from Columbia-Southern Chemical Corp., and Mistron vapor from Sierra Talc and Clay Co. The lime binds any water present and is useful where the composition must withstand temperatures above 212°F., as for example, in testing. Total finely divided solids is about 1.9 times the elastomeric material and the asbestos is about 0.8 times the elastomeric material.

Mixing Procedure.

The elastomers are charged into a jacketed rotary arm mixer and then the hydrogenated wood rosin is added and mixed in to a homogeneous mass, the mixing being carried out at about 160°F. Then the carbon black is added and mixed in to a smooth consistency. Then the asbestos and about one-fourth of the processing oil is added and mixed in. Now the hydrated silica, another fourth of the processing oil, and the talc and lime are mixed in. The balance of the processing oil now is mixed in and the mixture is cooled and discharged from the mixer. The composition is extruded through a die to form a tape which is mounted on a pliable release backing, for example, a silicone coated kraft release paper. The mounted tape is then heat treated in an oven at about 175°F. for 24 hours to relieve internal strains. Alternatively, if desired, the heat treatment may be at 210°F. for 80 minutes. The heat treatment reduces cold flow and increases rebound. The presence of cross linked butyl rubber is preferred to retard exudation of oil.

| Ingredient | Parts by Weight | |
|---|---|---|
| | Example III | Example IV |
| Butyl rubber | 100 | 400 |
| Chlorinated butyl rubber | 200 | — |
| Isobutylene divinyl aromatic copolymer | 100 | — |
| Hydrogenated wood rosin | 44 | 44 |
| Tall oil fatty acid | 8 | 8 |
| Carbon black (140 parts) | 82.3 | 82.3 |
| Oil in carbon black | 57.7 | 57.7 |
| Asbestos powder | 400 | 400 |
| Processing oil | 515 | 515 |
| Hydrated silica powder | 120 | 120 |
| Platy talc | 320 | 320 |
| Calcium oxide | 46 | 46 |

In the above example a commercial sample of the butyl rubber is Polysar butyl 301, which is a copolymer of about 98 to 98.5% isobutylene and 1.5 to 2% isoprene containing about 1.6 mol unsaturation and has a Mooney value about 60. Commercial examples of the other ingredients are given under Example I. The mixing and heat treating procedure are like Example I.

The compositions of Example III and IV were formed into tapes of I-beam cross section, and equal sections of each were tested by the following procedure.

Compressibility and recovery test.

Two three-inch lengths of tape are placed in parallel spaced relation between two flat polished glass plates three inches by three inches by one-fourth inch thick. The plates are compressed at the rate of two inches per minute until the tapes are compressed to 0.2 inches and the load, which is the maximum, is maintained for fifteen seconds and released. The combined thickness of the glass and tape is measured. Then after one hour the combined thickness is again measured, the difference in measurement being the rebound.

TEST DATA

| | Example III | Example IV |
|---|---|---|
| initial thickness (inch) | .4 | .4 |
| rebound thickness at 1 hour (inch) | .220 | .230 |
| flow at 24 hrs. at 190°F. (inch) | .019 | .010 |
| residual height at 24 hrs. (inch) | .201 | .220 |
| compressive load (pounds) | 96 | 110 |
| yield strength (P.S.I.) | 8 | 8 |
| Shore A hardness | 10 | 12 |

| | Examples V, VI and VII | | |
|---|---|---|---|
| | Parts by Weight Examples | | |
| Ingredient | V | VI | VII |
| chlorinated butyl rubber | 200 | 200 | 200 |
| isobutylene-divinyl aromatic polymer | 100 | 100 | 100 |
| butyl rubber | 100 | 100 | 100 |
| hydrogenated wood rosin | 44 | 44 | 44 |
| tall oil fatty acid | 8 | 8 | 8 |
| carbon black in oil (140 parts) | 82.3 | 82.3 | 82.3 |
| carbon black oil | 57.7 | 57.7 | 57.7 |
| processing oil | 515 | 515 | 515 |
| hydrated silica | 120 | 120 | 120 |
| platy talc | 320 | 320 | 320 |
| calcium oxide | 46 | 46 | 46 |
| "Bentone 34" | — | — | 400 |
| colloidal silica | — | 400 | — |
| bulk asbestos (fine) | 400 | — | — |

In the above examples "Bentone 34" is believed to be dimethyldioctadecyl ammonium bentonite. A commercial example of colloidal silica is "Cab-O-Sil" which is a submicroscopic particulate silica sold by Godfrey L. Cabot, Inc. The asbestos in example V is a finer particle size designated resin grade by Union Carbide and Carbon Co. In making the products of these examples the mixing procedure of examples I and II is carried out.

Compressibility-Recovery Test

| | Example V | Example VI | Example VII |
|---|---|---|---|
| initial thickness (inch) | .4 | .4 | .4 |
| rebound thickness at 1 hour (inch) | .227 | .214 | .210 |
| flow at 24 hours at 190°F. (inch) | .003 | .000 | .001 |
| residual height at 24 hours (inch) | .224 | .214 | .209 |
| compressive load (pounds) | 110 | 110 | 100 |
| yield strength (P.S.I.) | 8 | 11 | 15 |
| Shore A hardness | 13 | 16 | 18 |

| | Examples VIII and IX | |
|---|---|---|
| | Parts by Weight Examples | |
| Ingredient | VIII | IX |
| chlorinated butyl rubber | 200 | 200 |
| isobutylene-divinyl aromatic polymer | 100 | 100 |
| butyl rubber | 100 | 100 |
| hydrogenated wood rosin | 44 | 44 |
| tall oil fatty acid | 8 | 8 |
| carbon black (140 parts) black | 82.3 | 82.3 |
| oil in carbon black | 57.7 | 57.7 |
| fibrous talc | 400 | — |
| Wollastonite Pl | — | 400 |
| Sun oil 2280 (processing oil) | 515 | 515 |
| hydrated silica | 120 | 120 |
| platy talc | 320 | 320 |

-continued

Examples VIII and IX

| Ingredient | Parts by Weight Examples | |
|---|---|---|
| | VIII | IX |
| calcium oxide | 46 | 46 |

The compressibility and recovery test data for the compositions in Examples VIII and IX are here stated.

TEST DATA

| | Examples | |
|---|---|---|
| | VIII | IX |
| initial thickness (inch) | .4 | .4 |
| rebound at 1 hour (inch | .238 | .235 |
| flow at 24 hours at 190°F. (inch | .008 | .001 |
| residual height at 24 hours | .230 | .234 |
| max. compressive load (lbs.) | 80 | 80 |
| yield strength (P.S.I.) | 8 | 7 |
| Shore A hardness | 8 | 7 |

Following is a tabulation of the percent rebound, and flow (measured as reduction in height) at 190° after 24 hours, of the tapes made from the foregoing specific example compositions. The percent rebound is obtained by compressing the tape to half its original thickness, allowing it to remain unloaded for one hour, then measuring the recovery, and dividing the recovery amount by the original thickness multiplied by one hundred.

| Examples | % rebound | Inch Flow at 24 hours |
|---|---|---|
| III | 5 | .019 |
| IV | 7½ | .010 |
| V | 6¾ | .003 |
| VI | 3½ | .000 |
| VIII | 9½ | .008 |
| IX | 8¾ | .001 |

I claim:
1. An adhesive and sealing bedding composition adapted for adhesively attaching a glass panel to a flange about an opening in an automotive vehicle, said composition comprising an intimate mixture of:
   a. an elastomer in uncured state, said elastomer comprising a mixture of elastomers, one elastomer comprising a copolymer of a isobutylene and a divinyl aromatic compound, and there is also present a different polybutylene based elastomer;
   b. a plasticizing liquid for said elastomer of low volatility in the proportion of about ¾ to 2½ times the weight of elastomer, and
   c. finely divided solids in the ratio of about 0.93 to about 2.5 times the weight of elastomer, of which solids from 0.3 to 2.5 times the weight of elastomer comprises solids which limit cold flow in service in said automotive vehicle to the required extent selected from the groups:
      1. fibrous solids or
      2. solids which form thixotropic mixtures with the plasticizing liquid,
   said plasticizing liquid acting to permanently soften the composition so as to reduce spring back or rebound and allow permanent deformation under reduced load, said composition being extrudable into strand form and in said form being non-curing, soft and form retaining, and when measured as a rectangular strand about 0.4 inch on a side, having the properties of tensile yield strength above about 6 pounds per square inch, and being compressible to half thickness by a maximum force in the range about 25 to 46 pounds per square inch, having rebound after compression in the range of 2½ to 12½% of original thickness, flow in said service as measured by flow at 24 hours at 190°F. about zero to 0.02 inch and in destructive tension test between metal and glass surfaces failing entirely in coherence.

2. A composition as specified in claim 1 wherein the copolymer includes a small amount of a diolefin, copolymerized therein.

3. A composition as specified in claim 1 wherein the different polybutylene based elastomer is a butyl rubber.

4. A composition as specified in claim 1 wherein the different polybutylene based elastomer is a chlorinated butyl rubber.

5. An adhesive and sealing bedding composition adapted for adhesively attaching a glass panel to a flange about an opening in an automotive vehicle, said composition comprising an intimate mixture of:
   a. an elastomer in uncured state, said elastomer comprising a mixture of butyl rubber, chlorinated butyl rubber and isobutylene divinyl aromatic copolymer;
   b. a plasticizing liquid for said elastomer of low volatility in the proportion of at least 1.4 to 2½ times the weight of elastomer, and
   c. finely divided solids in the ratio of about 2.4 to about 2.5 times the weight of elastomer, of which solids from 1.2 to 2.5 times the weight of elastomer comprises solids which limit cold flow in service in said automotive vehicle to the required extent selected from the groups:
      1. fibrous solids or
      2. solids which form thixotropic mixtures with the plasticizing liquid, said plasticizing liquid acting to permanently soften the composition so as to reduce spring back or rebound and allow permanent deformation under reduced load, said composition being extrudable into strand form and in said form being non-curing, soft and form retaining, and when measured as a rectangular strand about 0.4 inch on a side, having the properties of tensile yield strength above about 6 pounds per square inch, and being compressible to half thickness by a maximum force in the range about 25 to 46 pounds per square inch, having rebound after compression in the range of 2½ to 12½% of original thickness, flow in said service as measured by flow at 24 hours at 190°F. about zero to 0.02 inch and in destructive tension test between metal and glass surfaces failing entirely in coherence.

6. A composition as specified in claim 1 wherein the different polybutene based elastomer is a halogenated butyl rubber.

7. An adhesive and sealing bedding composition adapted for adhesively attaching a glass panel to a flange about an opening in an automotive vehicle, said composition comprising an intimate mixture of:
   a. an elastomer in uncured state, said elastomer comprising a mixture including halogenated butyl rubber and an elastomeric copolymer of isobutylene, a diolefin and divinyl aromatic compound;

b. a plasticizing liquid for said elastomer of low volatility in the proportion of about ¾ to 2½ times the weight of elastomer, and c. finely divided solids in the ratio of about 0.93 to about 2.5 times the weight of elastomer, of which solids from 0.3 to 2.5 times the weight of elastomer comprises solids which limit cold flow in service in said automotive vehicle to the required extent selected from the groups:
  1. fibrous solids or
  2. solids which form thixotropic mixtures with the plasticizing liquid, said plasticizing liquid acting to permanently soften the composition so as to reduce spring back or rebound and allow permanent deformation under reduced load, said composition being extrudable into strand form and in said form being noncuring, soft and form retaining, and when measured as a rectangular strand about 0.4 inch on a side, having the properties of tensile yield strength above about 6 pounds per square inch, and being compressible to half thickness by a maximum force in the range about 25 to 46 pounds per square inch, having rebound after compression in the range of 2½ to 12½% of original thickness, flow in said service as measured by flow at 24 hours at 190°F. about zero to 0.02 inch and in destructive tension test between metal and glass surfaces failing entirely in coherence.

8. An adhesive and sealing bedding strand adapted for adhesively attaching a glass panel to a flange about an opening in an automotive vehicle, said strand being uncured after formation thereof and being free of reactive curing agents, the strand composition comprising:

a. an elastomeric material comprising a mixture of butyl rubber, chlorinated butyl rubber and isobutylene divinyl aromatic copolymer, said elastomeric material being intimately mixed with b. a plasticizing liquid for said elastomeric material of low volatility, in the proportion of at least 1.4 to about 2½ times the weight of elastomeric material, and c. finely divided solids in the ratio of at least 2.4 times to about 2½ times the weight of elastomeric material, of which finely divided solids, an amount at least 1 up to about 2.5 times the weight of elastomeric material comprises solids which limit cold flow to the required extent in service in said automotive vehicle, and are selected from the groups:
  1. fibrous solids or
  2. solids which form thixotropic mixtures with the plasticizing liquids, said elastomeric material being in sufficiently uncured state so that the composition is extrudable to form the strand which is soft and form retaining, said plasticizing liquid permanently softening the strand so as to reduce spring back or rebound and allow permanent deformation under reduced load, and when measured as a generally rectangular strand about 0.4 inch on a side, having the properties of tensile yield strength above about 6 pounds per square inch, and being compressible to half thickness by a force in the range of about 25 to 46 pounds per square inch, having a rebound one hour after compression in the range of 2½ to 12½% of original thickness, flow in said service as measured by flow at 24 hours at 190°F. about zero to 0.02 inch and in destructive tension test between metal and glass surfaces failing entirely in coherence.

* * * * *

UNITED STATES PATENT OFFICE
CERTIFICATE OF CORRECTION

PATENT NO. : 3,945,975
DATED : March 23, 1976
INVENTOR(S) : Donald Robert Strack It is certified that error appears in the above-identified patent and that said Letters Patent are hereby corrected as shown below:

Col. 4, line 22, "withoug" should read --without--

Col. 4, line 29, "butadieneacrylonitrile" should read --butadiene-acrylonitrile--

Col. 11, claim 1, line 7, "isobutylene" should read --polyisobutylene--

Signed and Sealed this

Fourteenth Day of September 1976

[SEAL]

Attest:

RUTH C. MASON
Attesting Officer

C. MARSHALL DANN
Commissioner of Patents and Trademarks